(12) United States Patent
Jang et al.

(10) Patent No.: US 10,564,783 B2
(45) Date of Patent: *Feb. 18, 2020

(54) TOUCH PANEL AND DISPLAY DEVICE INCLUDING THE SAME

(71) Applicant: Samsung Display Co., Ltd., Yongin-si, Gyeonggi-do (KR)

(72) Inventors: Hyoung Wook Jang, Anyang-si (KR); Hyun Jae Na, Seoul (KR); Jin Woo Noh, Hwaseong-si (KR); Soon Sung Ahn, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 76 days.

This patent is subject to a terminal disclaimer.

(21) Appl. No.: 15/894,664

(22) Filed: Feb. 12, 2018

(65) Prior Publication Data

US 2018/0164925 A1 Jun. 14, 2018

Related U.S. Application Data

(63) Continuation of application No. 14/504,245, filed on Oct. 1, 2014, now Pat. No. 9,898,146.

(30) Foreign Application Priority Data

Mar. 14, 2014 (KR) .................. 10-2014-0030527

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04106* (2013.01); *G06F 2203/04112* (2013.01)

(58) Field of Classification Search
CPC ................. G06F 3/044; G06F 3/0412; G06F 2203/04111; G06F 3/0416;
(Continued)

(56) References Cited

U.S. PATENT DOCUMENTS 7,663,607 B2 2/2010 Hotelling et al.
8,274,488 B2 9/2012 Bae
(Continued)

FOREIGN PATENT DOCUMENTS

CN 101943961 A 1/2011
CN 102929421 A 2/2013
(Continued)

*Primary Examiner* — Nelson M Rosario
*Assistant Examiner* — Scott Au
(74) *Attorney, Agent, or Firm* — Innovation Counsel LLP (57) ABSTRACT

A display device includes: a plurality of first electrode patterns; a plurality of second electrode patterns; a plurality of first touch signal lines; and a plurality of second touch signal lines. The plurality of first electrode patterns respectively include a plurality of first electrode cells physically separated from each other and arranged in a first direction. The plurality of second electrode patterns include a plurality of second electrode cells physically separated from each other and arranged in a second direction crossing the first direction. The plurality of first touch signal lines are connected to the first electrode cells. The plurality of second touch signal lines are connected to the second electrode cells. The first and second electrode patterns and the first and second touch signal lines are all positioned at the same layer on a substrate. The first touch signal lines are independently connected to each first electrode cell.

20 Claims, 7 Drawing Sheets

(58) Field of Classification Search
CPC . G06F 2203/04112; G06F 2203/04106; G06F 1/16
See application file for complete search history.

(56) References Cited

U.S. PATENT DOCUMENTS

| | | | |
|---|---|---|---|
| 8,319,747 | B2 | 11/2012 | Hotelling et al. |
| 9,081,453 | B2 | 7/2015 | Bulea et al. |
| 9,898,146 | B2 * | 2/2018 | Jang ..................... G06F 3/044 |
| 2011/0025639 | A1 | 2/2011 | Trend et al. |
| 2011/0048813 | A1 | 3/2011 | Yilmaz |
| 2011/0279169 | A1 | 11/2011 | Salaverry |
| 2011/0279397 | A1 | 11/2011 | Rimon et al. |
| 2011/0279409 | A1 | 11/2011 | Salaverry et al. |
| 2013/0181942 | A1 | 7/2013 | Bulea et al. |
| 2013/0181943 | A1 | 7/2013 | Bulea et al. |
| 2015/0062062 | A1 | 3/2015 | Han et al. |

FOREIGN PATENT DOCUMENTS

| | | |
|---|---|---|
| CN | 103026326 A | 4/2013 |
| CN | 103246422 A | 8/2013 |
| CN | 103577018 A | 2/2014 |
| EP | 2045698 A2 | 4/2009 |
| JP | 2010-541109 A | 12/2010 |
| JP | 2013526746 A | 6/2013 |
| JP | 2015-509245 A | 3/2015 |
| JP | 2015049889 A | 3/2015 |
| KR | 1020120140126 A | 12/2012 |
| KR | 1020130067869 A | 6/2013 |
| WO | 2009-046363 A1 | 4/2009 |

* cited by examiner

TOUCH PANEL AND DISPLAY DEVICE INCLUDING THE SAME

CROSS-REFERENCE TO RELATED APPLICATION

This application is a continuation application of U.S. patent application Ser. No. 14/504,245 filed on Oct. 1, 2014, which claims priority to and the benefit of Korean Patent Application No. 10-2014-0030527 filed in the Korean Intellectual Property Office on Mar. 14, 2014, the entire contents of which are incorporated herein by reference.

BACKGROUND

(a) Technical Field

The present application relates to a touch panel including a touch sensor and a display device including the same.

(b) Description of the Related Art

A flat panel display (FPD), such as an organic light emitting diode (OLED) display, a liquid crystal display (LCD), and an electrophoretic display (EPD) includes a field generating electrode and an electro-optical active layer. As the electro-optical active layer, the organic light emitting diode display includes an organic emission layer, the liquid crystal display includes a liquid crystal layer, and the electrophoretic display includes particles having a charge. The field generating electrode may receive a data signal by being connected to a switching element, such as a thin film transistor, and the electro-optical active layer displays an image by converting the data signal into an optical signal.

Recently, the display device has included a touch sensing function as well as the function for displaying the image such that it is capable of interaction with a user. A touch sensing function determines whether a user finger, etc., touches a screen, and touch position information thereof, by sensing a change of pressure, light, etc., that occurs on a screen in the display device when the user contacts the finger or a touch pen to the screen to write a character or to draw a picture. The display device may receive an image signal based on the touch information.

The touch sensing function may be realized by a touch sensor including a touch electrode. For example, in the capacitance type of touch sensor, a plurality of touch electrodes are connected to each other thereby forming a plurality of touch electrode rows and a plurality of touch electrode columns that are insulated from each other, and a driving signal is applied to each touch electrode row and each touch electrode column through a touch signal line. The touch sensor may drive the touch electrode rows and the touch electrode columns by a method using mutual capacitance formed between the touch electrode row and the touch electrode column, or a method using self-capacitance independently formed by the touch electrode rows and the touch electrode columns, respectively. However, when driving the touch sensor forming the touch electrode row and the touch electrode column by the connection of the touch electrode with the self-capacitance type, the touch sensor is driven by a unit of the electrode row and the electrode column, not the electrode unit, such that a multi-touch is not sensed by a ghost touch. The ghost touch may be understood as a position or positions on a touch panel to which no actual touch is applied, yet can be recognized by the touch sensor as having been touched.

On the other hand, the touch electrode row and the touch electrode column may be formed of a single layer or a plurality of layers. In the case of the single layer, as the touch signal lines are generally formed as numerous as the touch electrodes, an area of the touch electrodes is inevitably limited by a region occupied by the touch signal lines, and therefore touch sensitivity may also be limited.

A panel in which the touch sensor is formed is referred to as a touch panel (also as a touch sensor panel, a touch screen panel, etc.), and the display panel having the touch sensor function is also referred to as a touch panel.

The above information disclosed in this Background section is only for enhancement of understanding of the background and therefore it may contain information that does not form the prior art that is already known in this country to a person of ordinary skill in the art.

SUMMARY

Embodiments provide a touch panel capable of being driven as a mutual capacitance type and a self-capacitance type and including touch sensors having electrode patterns capable of sensing a multi-touch in both the mutual capacitance type and self-capacitance type, and a display device including the touch panel.

One embodiment provides a touch panel including a touch sensor capable of reducing a number of touch signal lines and a display device including the same.

A display device according to an exemplary embodiment includes: a plurality of first electrode patterns; a plurality of second electrode patterns; a plurality of first touch signal lines; and a plurality of second touch signal lines. The plurality of first electrode patterns respectively include a plurality of first electrode cells physically separated from each other and arranged in a first direction. The plurality of second electrode patterns include a plurality of second electrode cells physically separated from each other and arranged in a second direction crossing the first direction. The plurality of first touch signal lines are connected to the first electrode cells. The plurality of second touch signal lines are connected to the second electrode cells. The first and second electrode patterns and the first and second touch signal lines are all positioned at the same layer on a substrate. The first touch signal lines are independently connected to each first electrode cell.

A first electrode cell and a second electrode cell adjacent in the first direction may form a mutual capacitance type of touch sensor, and each first electrode cell may form a self-capacitance type of touch sensor.

Each first electrode pattern may include m, where m is an integer larger than 1, first electrode cells, and the m first electrode cells may be connected to m first touch signal lines with a one-on-one correspondence relationship.

The second electrode cells included in the different second electrode patterns may be connected substantially in the second direction by the second touch signal lines.

Each first electrode cell may form a pair along with n, where n is an integer larger than 1, adjacent second electrode cells, and the second electrode cells of a first group forming a pair along with any one first electrode cell may be connected to the second electrode cells of a second group forming a pair along with the first electrode cell adjacent to the any one first electrode cell in the second direction by n second touch signal lines with a one-on-one correspondence relationship.

The second electrode cells of the first group and the second electrode cells of the second group may be connected while forming the pairs in a sequence close to each other.

The second electrode cells included in each second electrode pattern may be electrically connected.

The second electrode cells included in each second electrode pattern may be detachably electrically connected.

The first and second electrode patterns and first and second touch signal lines may be formed of a transparent conductive material, a conductive nanowire, or a metal mesh.

A display device according to an exemplary embodiment includes: a display panel including a plurality of pixels; a touch panel including a plurality of touch sensors; a display controller controlling the display panel; and a touch sensor controller controlling the touch panel. The touch panel includes: a plurality of first electrode patterns; a plurality of second electrode patterns; a plurality of first touch signal lines; and a plurality of second touch signal lines. The plurality of first electrode patterns are arranged in a first direction and include a plurality of first electrode cells physically separated from each other. The plurality of second electrode patterns are arranged in a second direction crossing the first direction and include a plurality of second electrode cells physically separated from each other. The plurality of first touch signal lines are connected to the first electrode cells. The plurality of second touch signal lines are connected to the second electrode cells. The first and second electrode patterns and the first and second touch signal lines are all positioned at the same layer on a substrate. The first touch signal lines are independently connected to each first electrode cell.

A first electrode cell and a second electrode cell adjacent in the first direction may form a mutual capacitance type of touch sensor, and each first electrode cell may form a self-capacitance type of touch sensor.

Each first electrode pattern may include m, where m is an integer larger than 1, first electrode cells, and the m first electrode cells may be connected to m first touch signal lines with a one-on-one correspondence relationship.

The second electrode cells included in the different second electrode patterns may be connected substantially in the second direction by the second touch signal lines.

Each first electrode cell may form a pair along with n, where n is an integer larger than 1, adjacent second electrode cells, and the second electrode cells of a first group forming a pair along with any one first electrode cell may be connected to the second electrode cells of a second group forming a pair along with the first electrode cell adjacent to the any one first electrode cell in the second direction by n second touch signal lines with a one-on-one correspondence relationship.

The second electrode cells of the first group and the second electrode cells of the second group may be connected while forming the pairs in a sequence close to each other.

The second electrode cells included in each second electrode pattern may be electrically connected.

A switching part capable of electrically disconnecting the second electrode cells included in each second electrode pattern may be further included.

The first and second electrode patterns and first and second touch signal lines may be formed of a transparent conductive material, a conductive nanowire, or a metal mesh.

The touch panel according to one embodiment may be driven as the mutual capacitance type and the self-capacitance type, and the two types may both sense the multi-touch.

Also, in the structure in which the touch electrodes and the touch signal lines are formed at one layer, the number of the touch signal lines may be reduced such that a region of the touch electrodes may be increased, and as a result, touch sensitivity may be improved.

DETAILED DESCRIPTION OF THE EMBODIMENTS

In the following detailed description, only certain exemplary embodiments have been shown and described, simply by way of illustration. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. Meanwhile, although reference numerals described in the specification are all not shown in drawings, the correspondence between reference numerals in the specification and constituents in the drawings will be easily and clearly understandable by those skilled in the art from a regularity of the reference numerals described in the drawings.

A touch panel including a touch sensor according to an exemplary embodiment will now be described with reference to accompanying drawings.

Figure 1:
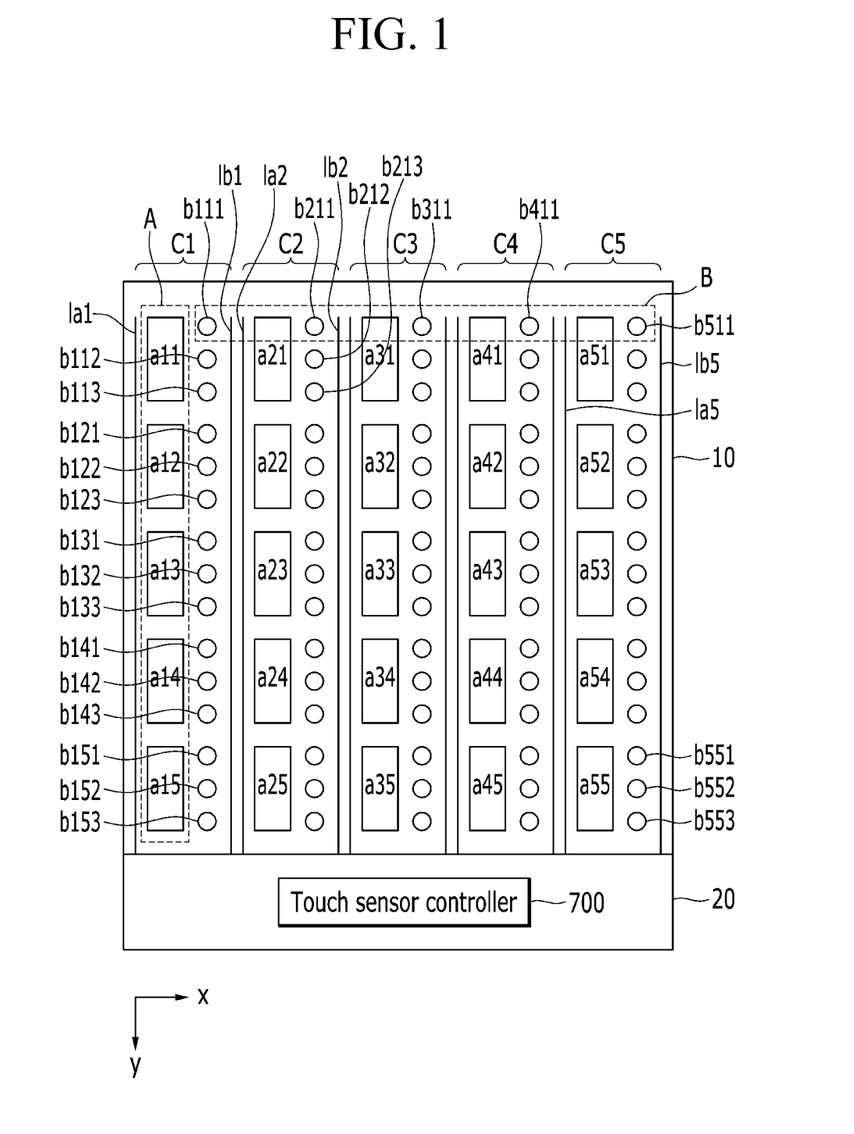
FIG. 1 is a schematic view of a touch panel according to an exemplary embodiment.

FIG. 1 is a schematic view of a touch panel 10 according to an exemplary embodiment.

FIG. 1 schematically shows an exemplary arrangement of constituent elements of the touch panel 10, but does not reflect an actual shape, a connection relationship, or a number of constituent elements.

Referring to FIG. 1, the touch panel 10 according to an exemplary embodiment includes a plurality of electrode patterns A and B forming a touch sensor sensing a contact of an external object such as a finger or a pen. The electrode patterns A and B may be formed at an outer surface of a substrate forming a display panel displaying an image (an on-cell type), or may be formed inside the display panel (an in-cell type). Also, the electrode patterns A and B may be formed at a separate substrate made of a transparent insulator such as glass or plastic, and may be attached to the display panel (an add-on type).

The first electrode pattern A and the second electrode pattern B are physically and electrically separated. The first electrode pattern A and the second electrode pattern B are formed at the same layer and are formed in the touch region of the touch panel 10. Here, the touch region means a region sensing the contact or the movement as the touch area in a case that the object is hovering in a state that the object is close or accesses (a non-contact touch) as well as a case that the object directly contacts the touch panel 10 (a contact touch). The touch region may overlap the display area where the image is actually displayed in the display panel, or may approximately accord with it.

The first electrode patterns A are arranged in a horizontal direction. Each first electrode pattern A includes a plurality of first electrode cells a11, a12, . . . , a21, a22, . . . , sometimes called touch electrodes, arranged in a vertical direction. The second electrode patterns B are arranged in the vertical direction. Each second electrode pattern B includes a plurality of second electrode cells b111, b211, . . . , b112, b212, . . . , sometimes called touch electrodes, arranged in the horizontal direction.

In a view of the electrode cell, the first electrode cells a11, . . . are arranged in a matrix direction and the second electrode cells b111, . . . are also arranged in a matrix direction. The second electrode cells b111, b112, and b113 are disposed between the first electrode cells a11 and a21 adjacent in the horizontal direction, and the first electrode cell a21 is positioned between the second electrode cells b111 and b211 adjacent in the horizontal direction. Accordingly, the first electrode cell and the second electrode cell are alternately disposed one by one in the horizontal direction. According to the exemplary embodiment, in the horizontal direction, the first electrode cell and the second electrode cell may be alternately disposed two by two. On the other hand, the second electrode cell is not positioned between the first electrode cells a11 and a12 adjacent in the vertical direction, and the first electrode cell is not positioned between the second electrode cells b111 and b112 adjacent in the vertical direction.

In the drawing, for easy differentiation of the first electrode cell and the second electrode cell, the first electrode cell is indicated by a rectangle and the second electrode cell is indicated by a circle, however a shape of the electrode cells is not limited thereto and the shape may be various. For example, the first and second electrode cells may be the rectangle, and they may have a protrusion to improve sensitivity of the touch sensor. Also, the first electrode cells may have different sizes according to the position and the second electrode cells are also the same.

The first electrode cells a11, a12, . . . of the first electrode pattern A and the second electrode cells b111, b112, b113, b121, b122, b123, . . . adjacent thereto in the horizontal direction form a touch sensor of a mutual capacitance type. At this time, the touch sensor controller 700 may sense the position of an X axis on the touch panel 10 by using the second electrode pattern B, and the position of a y axis on the touch panel 10 by using the first electrode pattern A. The combination of the first electrode cells and the second electrode cells forming the mutual capacitance type of touch sensor is indicated by columns C1, C2, . . . in the drawing, and a number of the columns corresponds to a number of the first electrode patterns A or a number of the second electrode cells included in one second electrode pattern B.

In each column, nodes of a number corresponding to the number of the second electrode cells may exist. Here, the node means a unit of a position combination that may be differentiated from each other when generating the position information by the mutual capacitance type. In each column, one of the first electrode cells a11; a12; may correspond to a plurality of second electrode cells b111, b112, b113; b121, b122, b123; . . . . FIG. 1 shows an example of five groups of the first electrode cell and the second electrode cells having the above correlation in each column. Also, FIG. 1 shows an example in which one first electrode cell corresponds to three second electrode cells, and in this case, three nodes may be generated in one first electrode cell.

The first electrode cells a11, a12, . . . ; a21, a22, . . . ; . . . respectively form a self-capacitance type of touch sensor. At this time, the touch sensor controller 700 may sense the position of the x axis and the position of the y axis on the touch panel 10 from each first electrode cell. According to an exemplary embodiment, the second electrode cells b111, b211, . . . ; b112, b212, . . . ; . . . may also form the self-capacitance type of touch sensor separately or in combination.

In each column C1, C2, . . . , first touch signal lines la1, la2, . . . connected to the first electrode cells are positioned at a side of the first electrode cells, and second touch signal lines lb1, lb2, . . . connected to the second electrode cells are positioned at a side of the second electrode cells. These first and second touch signal lines are formed at the same layer as the first and second electrode cells and are positioned in the touch region of the touch panel 10. However, the touch signal lines positioned rightmost and leftmost may be positioned near the touch region. The detailed connection of the first and second electrode cells and the first and second touch signal lines will be described with reference to FIG. 2 to FIG. 4.

To avoid complicated drawings, in FIG. 1, one first touch signal line is shown per column, however the first touch signal lines of the number corresponding to the number of the first electrode cells may be positioned. One second touch signal line is shown per column, however a plurality of second touch signal lines may be positioned. Accordingly, the area of the electrode patterns A and B is limited by the region occupied by the first and second touch signal lines. In other words, as the area of the touch signal lines is increased, the area of the electrode patterns is decreased such that the touch sensitivity may be deteriorated. On the other hand, in FIG. 1, the first touch signal lines la1, la2, . . . are disposed at the left of the first electrode cell connected thereto, and the second touch signal lines (lb1, lb2, . . . are disposed at the right of the second electrode cell connected thereto, however this does not limit the position of the first and second touch signal lines. For example, the first touch signal line may be positioned at the right of the first electrode cell connected thereto, and a portion thereof may be positioned at the left and the rest thereof may be positioned at the right.

The first electrode pattern, the second electrode pattern, the first touch signal line, and the second touch signal line may be formed at the same layer. They may be formed of a transparent conductive oxide (TCO) such as indium tin oxide (ITO) and indium zinc oxide (IZO), a conductive nanowire such as silver nanowire (AgNW), or a metal mesh. For example, indium tin oxide (ITO) is deposited and patterned on the substrate to simultaneously form the first and second electrode patterns and the first and second touch signal lines.

The first and second touch signal lines are connected to the touch sensor controller 700 through wires (not shown) that may be positioned within a sensor circuit 20. Accordingly, the first and second electrode cells may receive a touch signal such as a sensing input signal from the touch sensor controller 700 through the first and second touch signal lines, and may transmit the touch signal such as a sensing output signal to the touch sensor controller 700. The sensor circuit 20 may be formed near the touch region of the touch panel 10, or may be formed at a separate printed circuit board (PCB) or a flexible printed circuit board (FPCB). The touch sensor controller 700 may be positioned in the sensor circuit 20, or may be positioned outside of the sensor circuit 20 to be connected to the sensor circuit 20 through the flexible printed circuit board (FPCB).

Next, a connection of the touch signal line will be described in detail with reference to FIG. 2 to FIG. 5.

FIG. 2 to FIG. 5 are views of a portion of a touch panel according to several exemplary embodiments.

Figure 2:
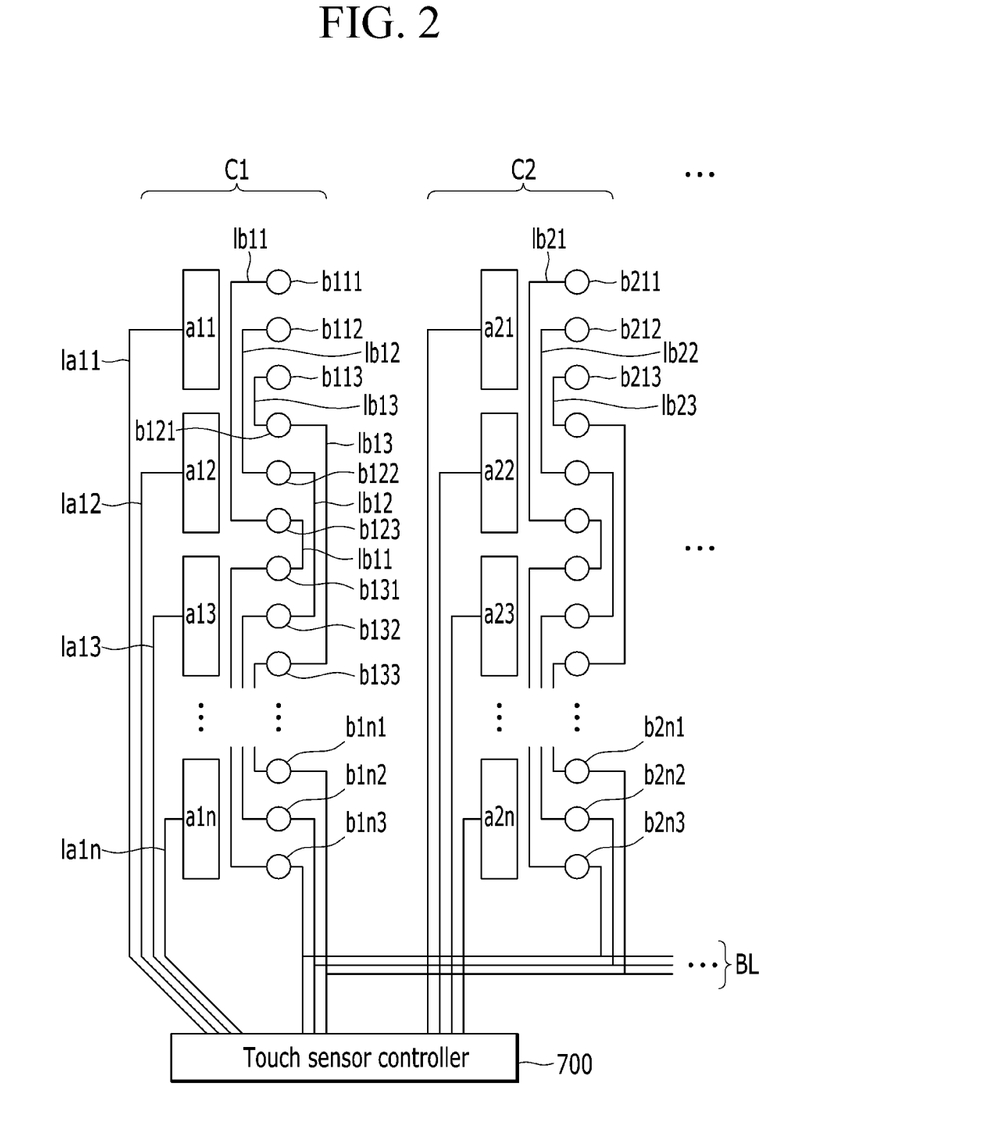
FIGS. 2, 3, 4, and 5 are views showing a portion of a touch panel according to several exemplary embodiments.

Firstly, FIG. 2, the columns C1, C2, . . . including the first electrode cells and the second electrode cells, and the first touch signal lines and the second touch signal lines connected thereto, are shown. In the touch panel 10, the columns C1, C2, . . . of a predetermined number exist with the same pattern in the horizontal direction. The arrangement of the first and second electrode patterns A and B is substantially the same as that shown in FIG. 1, however the first electrode cells a11, a12, . . . , a1n; a21, a22, . . . , a2n are disposed in the vertical direction by the n number.

In the first column C1, the first electrode cells a11, a12, . . . , a1n of one first electrode pattern A and the second electrode cells b111, b112, . . . , b1n3 of the different second electrode patterns B are disposed. Also, in the first column C1, the first touch signal lines la11, la12, . . . , la1n are connected to the first electrode cells a11, a12, . . . , a1n, and the second touch signal lines lb11, lb12, lb13 are connected to the second electrode cells b111, b112, . . . , b1n3. These arrangement and connection are equally applied to the second column C2, . . . . That is, in the second column C2, the first electrode cells a21, a22, . . . , a2n of one first electrode pattern A, the second electrode cells b211, b212, . . . , b2n3 of the different second electrode patterns B, the first touch signal lines la21, la22, . . . , la2n, and the second touch signal lines lb21, lb22, lb23 are disposed, the first touch signal lines are connected to the first electrode cells, and the second touch signal lines are connected to the second electrode cells. Next, the connection of the touch signal lines will be described with respect to the first column C1, unless otherwise specifically stated, the same description may also be applied to the other columns C2, . . . .

The first touch signal lines la11, la12, . . . , la1n are individually connected to the first electrode cells a11, a12, . . . , a1n. Accordingly, the n first touch signal lines exist by the number of the first electrode cells within the first column C1. The first touch signal lines la11, la12, . . . , la1n may be positioned within the touch region and substantially extend in the vertical direction. In the drawing, the first touch signal lines la11, la12, . . . , la1n are all extended downward, however according to an exemplary embodiment, they may be extended upward, or a portion thereof may be extended downward and the rest thereof may be extended upward.

The first touch signal lines la11, la12, . . . , la1n may be individually connected to the touch sensor controller 700 through the sensor circuit. Accordingly, the first electrode cells a11, a12, . . . , a1n may individually receive the sensing input signal Tx driving them from the touch sensor controller 700, and may individually output a sensing output signal Rx that is changed according to the touch existence for the touch region where the first electrode cells a11, a12, . . . , a1n are positioned. This means that each of the first electrode cells a11, a12, . . . , a1n function as the self-capacitance type of touch sensor. Also, since the first electrode cells a11, a12, . . . , a1n are independently driven such that the touch sensor controller 700 may receive the sensing output signal Rx from each of the first electrode cells a11, a12, . . . , a1n, when a touch of a plurality of positions occurs, that is, a multi-touch is generated, the multi-touch may be sensed by calculating the positions (coordinates) of the first electrode cell sensing the touch of the corresponding position.

The n second electrode cells may be disposed close to each first electrode cell, and in the drawing, three second electrode cells are disposed, as one example. For example, the second electrode cells b111, b112, and b113 of a first group are disposed close to the 1st first electrode cell a11, and the second electrode cells b121, b122, and b123 of the second group are disposed close to the 2nd first electrode cell a12, and by this method, the second electrode cells b1n1, b1n2, and b1n3 of the n-th group are disposed close to the n-th first electrode cells a1n.

When each group includes three second electrode cells, three second touch signal lines lb11, lb12, and lb13 are connected to the second electrode cell of each group. However, differently from the case of the first electrode cell, the second touch signal lines are not individually connected, but they are connected in a pair between the second electrode cells of the groups adjacent in the vertical direction. That is, the 1st second electrode cell b111 of the first group is connected to the 3rd second electrode cell b123 of the second group through the second touch signal line lb11, and the 3rd second electrode cell b123 of the second group is connected to the 1st second electrode cell b131 of the third group, and this connection is continued to the 1st or 3rd second electrode cell b1n1 or b1n3 of the n group. The 2nd second electrode cell b112 of the second group is connected to the 2nd electrode cells b122-b1n2 of the second to n-th group through the second touch signal line lb12. The 3rd second electrode cell b113 of the first group is connected to the 1st second electrode cell b121 of the second group and the 3rd second electrode cell b133 of the third group through the second touch signal line lb13, and this connection is continued to the 3rd or 1st electrode cells b1n3 or b1n1 of the n-th group. Resultantly, in the first column C1, three second touch signal lines lb11, lb12, and lb13 are only connected to the touch region and are connected to the touch sensor controller 700 through the sensor circuit.

When each group includes the n second electrode cells, the n second touch signal lines are disposed and connected. Accordingly, when the n first electrode cells (accordingly, the n groups) are disposed in each column and the m second electrode cells are disposed in each group, n+m touch signal lines are disposed in each column and n*m nodes are generated. These are the same as the number of the second electrode cells positioned in each column.

In each group, the second electrode cells b111, b121, . . . , b1n1; b112, b122, . . . , b1n2; . . . of the same order to each other are not connected but are connected while forming the pairs b113, b121; b112, b122; b113, b121 into the close sequence in the adjacent groups to not cross the second touch signal lines lb11, lb12, and lb13 such that a short is not generated therebetween. Accordingly, when each group includes the n second electrode cells, for example, the 1st, 2nd, 3rd, and n-th second electrode cells of the first group are respectively connected to the n-th, (n−1)-th, (n−2)-th, and 1st second electrode cells of the second group.

The second touch signal lines lb11, lb12, and lb13 are alternately positioned at the right and left of the electrode cells when connecting the second electrode cells of the adjacent groups. For example, as shown, when connecting the second electrode cells b111, b112, and b113 of the first group and the second electrode cells b121, b122, and b123 of the second group, the second touch signal lines lb11, lb12, and lb13 are positioned at the left of the second electrode cells, and when connecting the second electrode cells b121, b122, and b123 of the second group and the second electrode cells b131, b132, and b133 of the third group, the second touch signal lines lb11, lb12, and lb13 are positioned at the right of the second electrode cells, and this is repeated until completing the connection of the second electrode cell of the n-th group. On the other hand, the second touch signal lines may be connected by a shortest distance (i.e., is not positioned at the left or the right of the second electrode cells, but is positioned between two second electrode cells in a straight line) when connecting the closest second electrode cells (for example: b113, b121) between the adjacent groups.

In the first column C1, the first electrode cell and the second electrode cell adjacent thereto form the mutual capacitance type of touch sensor. For this, the second electrode cell may receive the sensing input signal Tx through the second touch signal lines lb11, lb12, and lb13, and the first electrode cell may output the sensing output signal Rx through the first touch signal lines la11, la12, . . . , la1n. The second electrode cells included in the different groups are connected to by the second touch signal line, for example, if the sensing input signal Tx is input through the second touch signal line lb11, the sensing input signal Tx is simultaneously input to the second electrode cells b111, b123, b131, . . . of each group. However, since the n first electrode cells forming the pairs along with the second electrode cells of each group are disposed and the first touch signal line is individually connected for the first electrode cell, the first electrode cell outputting the sensing output signal Rx that is changed by the touch and the second electrode cell forming the pair along with the first electrode cell are specified to sense the position of the x axis and the multi-touch.

The arrangement and the connection relationship of the first and second electrode cells and the first and second touch signal lines in the second column C2 is the same as the case of the above-described first column C1. However, in relation to the first column C1, the second touch signal lines lb21, lb22, and lb23 in the second column C2 may be connected to the second touch signal lines lb11, lb12, and lb13 in the first column C1 through three bus lines BL (when the second touch signal lines are m, the m bus lines) of a sensing circuit. Although not shown, the second touch signal lines of the other columns are the same. By this, the second electrode cells b111, b211, . . . ; b112, b212, . . . ; . . . positioned at the same row are electrically connected to each other thereby forming one second electrode pattern B. Accordingly, if the sensing input signal Tx is applied to any one second touch signal line, the sensing input signal Tx is input to all second electrode cells connected to the corresponding second touch signal lines. In other words, when the sensing input signal Tx is input to any one second electrode cell of the specified second electrode pattern B, the sensing input signal Tx is also input to all other second electrode cells of the corresponding second electrode pattern B.

On the other hand, according to an exemplary embodiment, the second electrode cells may be driven to form the self-capacitance type of touch sensor. In this case, the second touch signal line may be used to transmit the sensing input signal Tx and the sensing output signal Rx for the driving of the self-capacitance type.

Figure 3:
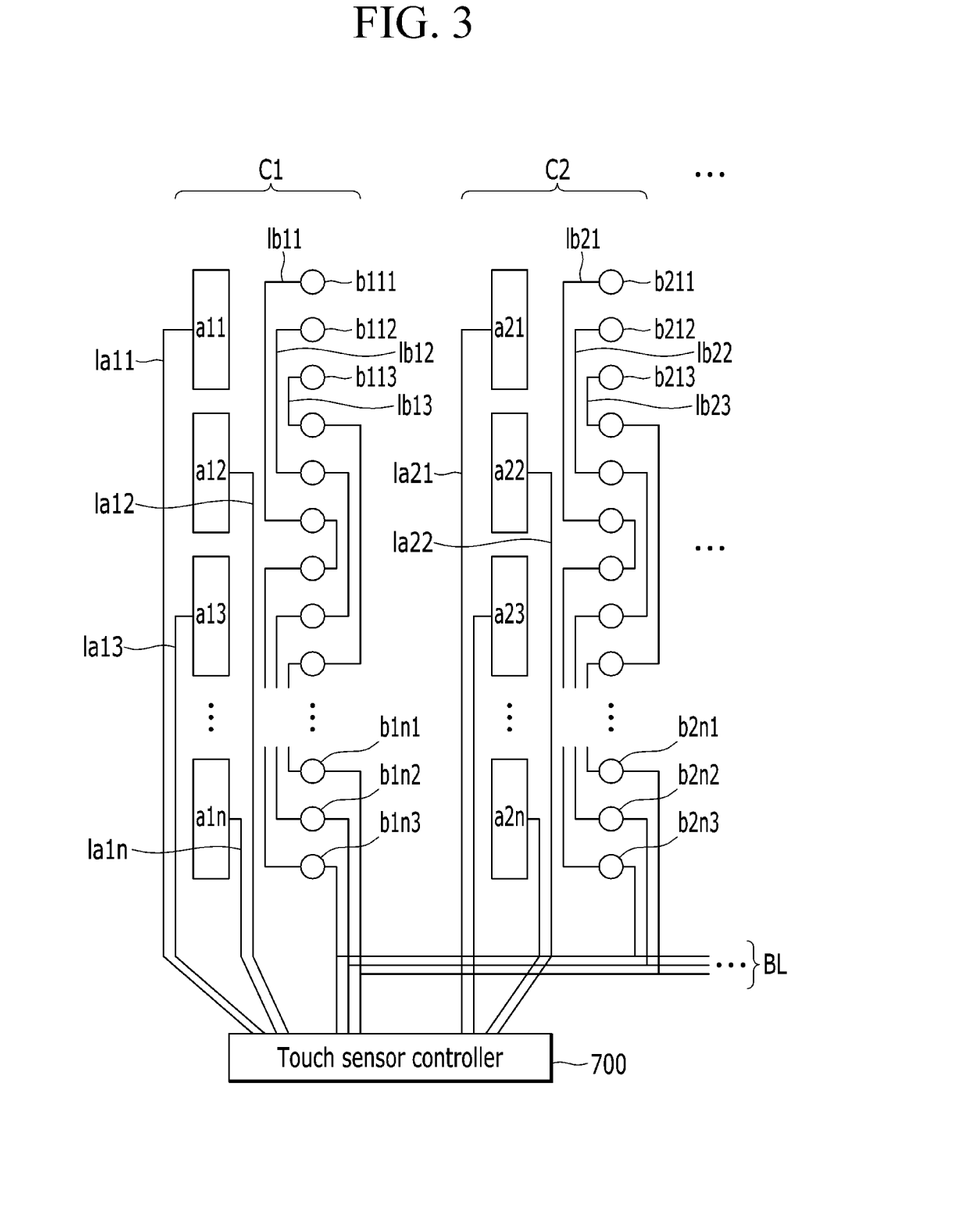

FIG. 3 is another exemplary embodiment like the exemplary embodiment of FIG. 2, except for the arrangement of the first touch signal line. Referring to differences, in the exemplary embodiment of FIG. 2, the first touch signal line is only disposed at one side of the first electrode pattern A, however in the exemplary embodiment of FIG. 3, the first touch signal lines are disposed at both sides of the first electrode pattern A. For example, as shown in FIG. 3, in the second column C2, the first touch signal lines la21, la22, . . . . may be alternately disposed in the right and left for every one of the adjacent first electrode cells a21, a22, . . . .

In this case, since the distance for the second electrode cells b111, b112, . . . disposed in the first column C1 adjacent thereto is relatively close, the first electrode cells a21, a22, . . . of the second column C2 may form the mutual capacitance type of touch sensor along with the second electrode cells b111, b112, . . . of the first column C1. Accordingly, compared with the exemplary embodiment of FIG. 2, without increasing the number of electrode cells or the number of touch signal lines, the number of nodes may be increased.

Figure 4:
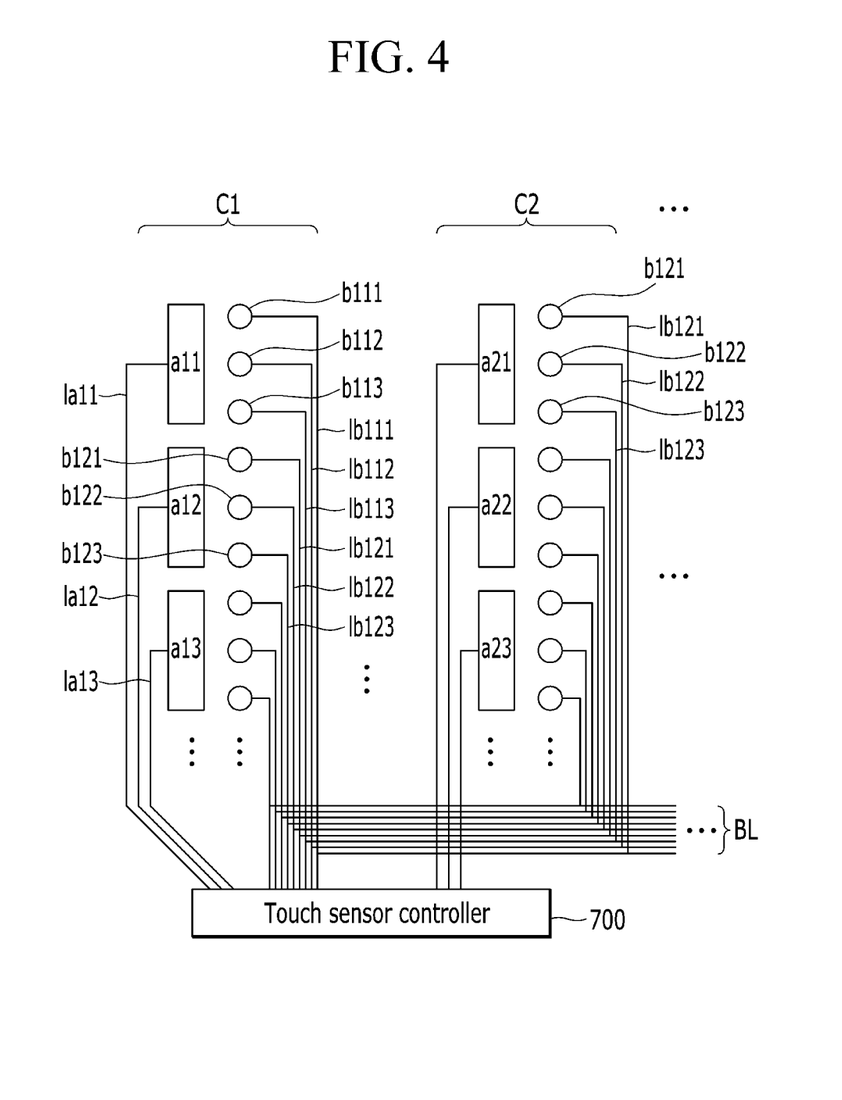

FIG. 4 is another exemplary embodiment having a different arrangement and number of second touch signal lines and number of bus lines BL from the exemplary embodiment of FIG. 2. For example, in the first column C1, the second touch signal lines lb111, lb112, lb113, lb121, lb122, lb123 . . . are individually connected to each of the second electrode cells b111, b112, b113, b121, b122, b123, . . . . Accordingly, in the exemplary embodiment of FIG. 4, the number of the second touch signal lines are disposed corresponding to the number of the second electrode cells. Accordingly, in the exemplary embodiment of FIG. 4, the number of second touch signal lines is larger than that of the exemplary embodiment of FIG. 2. That is, when each group includes the m second electrode cells, the number of touch signal lines in the column is n+nm. However, when the second electrode cell is driven with the self-capacitance type, there is a merit that ghost touch coordinates or ghost positions are not created in the same column. Herein, the ghost touch may mean a position or positions on a touch panel to which no actual touch is applied, yet can be recognized by the touch sensor as having been touched.

Figure 5:
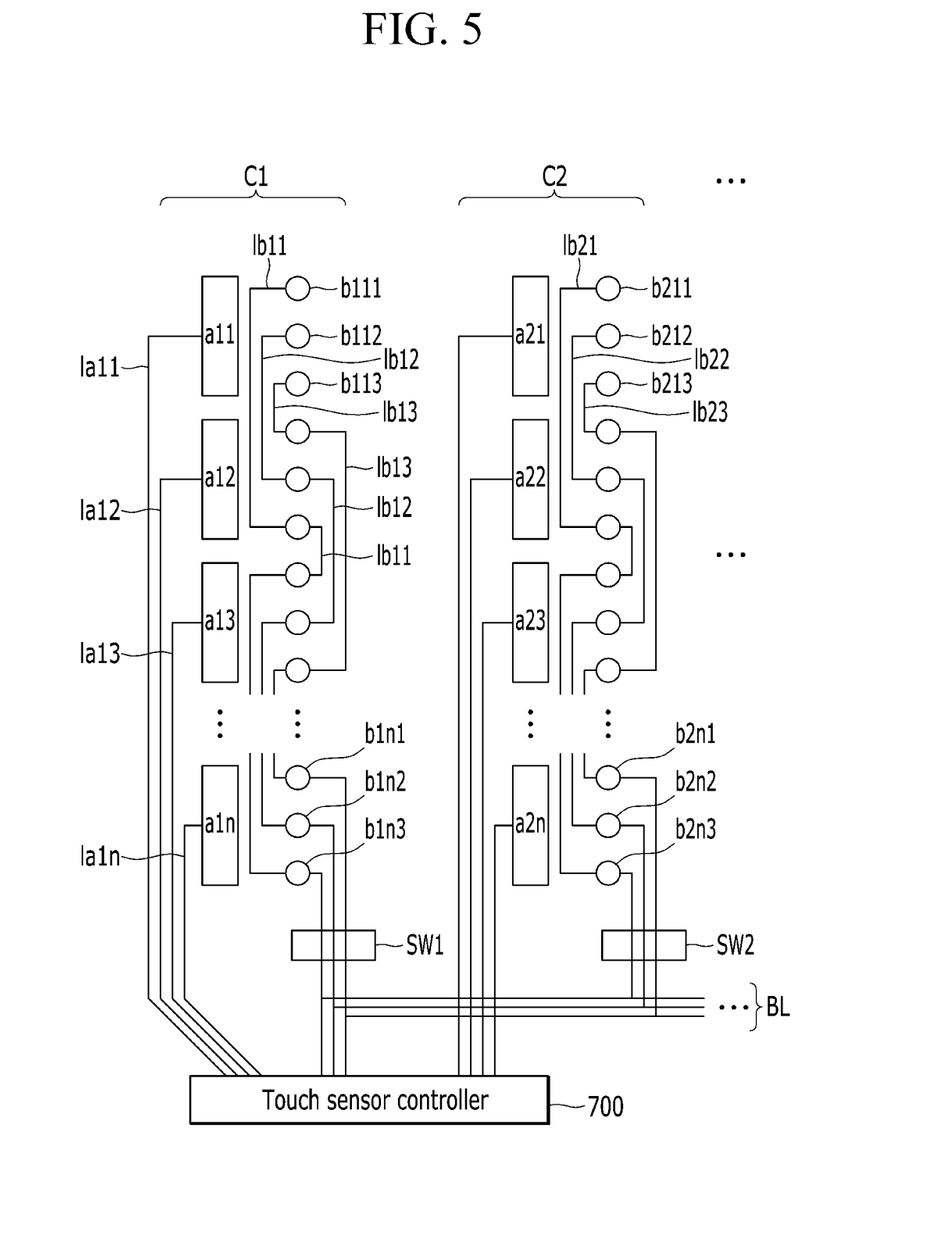

In FIG. 5, compared with the exemplary embodiment of FIG. 2, switches SW1, SW2, . . . are disposed between the bus lines BL and the second touch signal lines. The switches SW1, SW2, . . . may connect or disconnect the bus lines BL and the second touch signal lines, and may be selectively operated. To form the switches is easy when the second electrode cell is driven with the self-capacitance type. For example, at a predetermined time, if the first switch SW1 only connects the bus lines BL and the second touch signal lines of the first column C1 and the other switches SW2, . . . disconnect the bus lines BL and the second touch signal lines of the other columns C2, . . . , the second electrode cells of the first column C1 are not electrically connected to the second electrode cells of the other columns C2, . . . . Accordingly, when the second electrode cell is driven with the self-capacitance type, the ghost touch coordinates are not generated in the other columns C2, . . . where the second touch signal line is disconnected from the bus lines BL by the switches SW2, . . . . When the switch that is driven as described above is combined to the exemplary embodiment of FIG. 4, it is possible for each second electrode cell to be independently driven, and accordingly, the ghost touch signal is not generated when the second electrode cell is driven with the self-capacitance type. The switches SW1, SW2, . . . may be positioned inside the sensing circuit, and may be controlled by the touch sensor controller 700.

Figure 6:
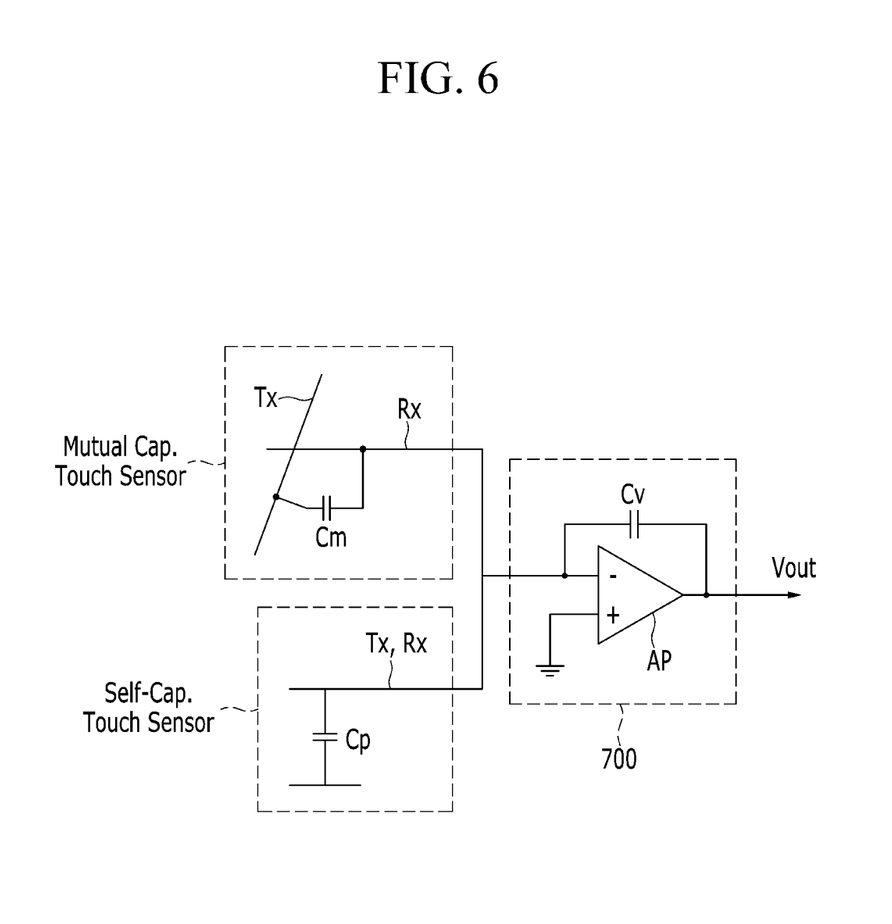
FIG. 6 is a circuit diagram of a touch sensor and a touch sensor controller according to an exemplary embodiment.

FIG. 6 is a circuit diagram of a touch sensor and a touch sensor controller according to an exemplary embodiment.

As described above, basically, the first electrode cells of the first electrode pattern A form the self-capacitance type of touch sensor and combine the second electrode cells of the second electrode pattern B to form the mutual capacitance type of touch sensor. Accordingly, the touch sensor in accordance with one embodiment is driven with the self-capacitance type and the mutual capacitance type, and for example, the former may be used to sense the non-contact contact and the latter may be used to sense the contact touch.

Now, for the mutual capacitor type, a case that that the sensing input signal Tx is input to the second electrode cells and the sensing output signal Rx is output from first electrode cells will be described. The sensing input signal Tx may have various waveforms and voltage levels, and for example, may include a pulse that is periodically output, or at least two different voltage levels. A DC voltage may be applied to the first electrode cells. For example, the sensing input signal Tx may be a square wave that is swing from about 0 V to about 3 V, and the DC voltage may be about 1.5 V. Although the DC voltage is applied to the first electrode cells, the voltage of the first electrode cells is changed by the coupling of the swing sensing input signal Tx and is output as the sensing output signal Rx. Since the first electrode cell and the second electrode cell form the mutual capacitor Cm, if the touch such as the finger or the pen is generated, the charge amount charged to the mutual capacitor Cm is changed by the potential difference between the first electrode cell and the second electrode cell. As a result, a width of the voltage change of the sensing output signal Rx is changed. The touch sensor controller 700 receives and processes the sensing output signal Rx having this change, thereby generating the touch information such as the touch existence and the touch position. The touch sensor controller 700 may include a plurality of amplifiers AP connected to the touch signal line. The amplifier AP may include a capacitor Cv connected to an inversion terminal (−) and an output terminal. A non-inversion terminal (+) of the amplifier AP is connected to a predetermined voltage such as a ground voltage, and the inversion terminal (−) of the amplifier AP is connected to the sensing output signal line. The amplifier AP as a current integrator integrates the sensing output signal Rx during a predetermined time (e.g., 1 frame) to generate the touch information signal Vout. According to an exemplary embodiment, the sensing input signal Tx may be input to the first electrode cell, and the sensing output signal Rx may be output from the second electrode cell.

In the case of the self-capacitance type, like the mutual capacitance type, for example, a self-capacitor Cs that may be formed along with the common electrode of the pixel is used, not a capacitor that may be formed by the first electrode cell and the adjacent second electrode cell. Accordingly, differently from the mutual capacitor Cm substantially formed in the horizontal direction, the self-capacitor Cs is substantially formed in the vertical direction. Also, the first touch cell receives the sensing input signal Tx and outputs the sensing output signal Rx. The sensing input signal Tx may be a pulse wave that is, for example, periodically output. If the sensing input signal Tx is applied to the first electrode cell, the self-capacitor Cs is charged with the charge and the first electrode cell outputs the sensing output signal Rx. If the touch is not generated, since the charge amount charged to the self-capacitor Cs is not changed, the first electrode cell outputs substantially the same sensing output signal Rx as the sensing input signal Tx, however if the touch is generated, the charge is changed such that the sensing output signal Rx is charged. The touch sensor controller 700 processes this change as described above to generate the touch information signal Vout. While the first electrode cell is driven with the self-capacitance type, the second electrode cell may be in a ground state or a floating state, and the second electrode cell may be input with the pulse wave. According to an exemplary embodiment, the second electrode cells of the second electrode pattern B may form the self-capacitance type of touch sensor independently or in combination.

The touch panel according to an exemplary embodiment may be driven to perform the touch sensing by the self-capacitor type and the touch sensing by the mutual capacitor type. For example, the first electrode cell is driven with the self-capacitance type during the first period for each frame, and the first and second electrode cells are driven with the mutual capacitor type during the second period. For this, the touch sensor controller 700 transmits the sensing input signal Tx to the first electrode cell during the first period and receives the sensing output signal Rx, and transmits the sensing input signal Tx to the second electrode cell and receives the sensing output signal Rx from the first electrode cell during the second period. Simultaneously, the touch sensor controller 700 processes the sensing output signal Rx that is received from the first electrode cell during the first period during the second period to generate a first touch information signal (e.g., the touch information signal for the non-contact touch), and processes the sensing output signal Rx that is received from the first electrode cell during the second period during the first period to generate a second touch information signal (e.g., the touch information signal for the contact touch).

Figure 7:
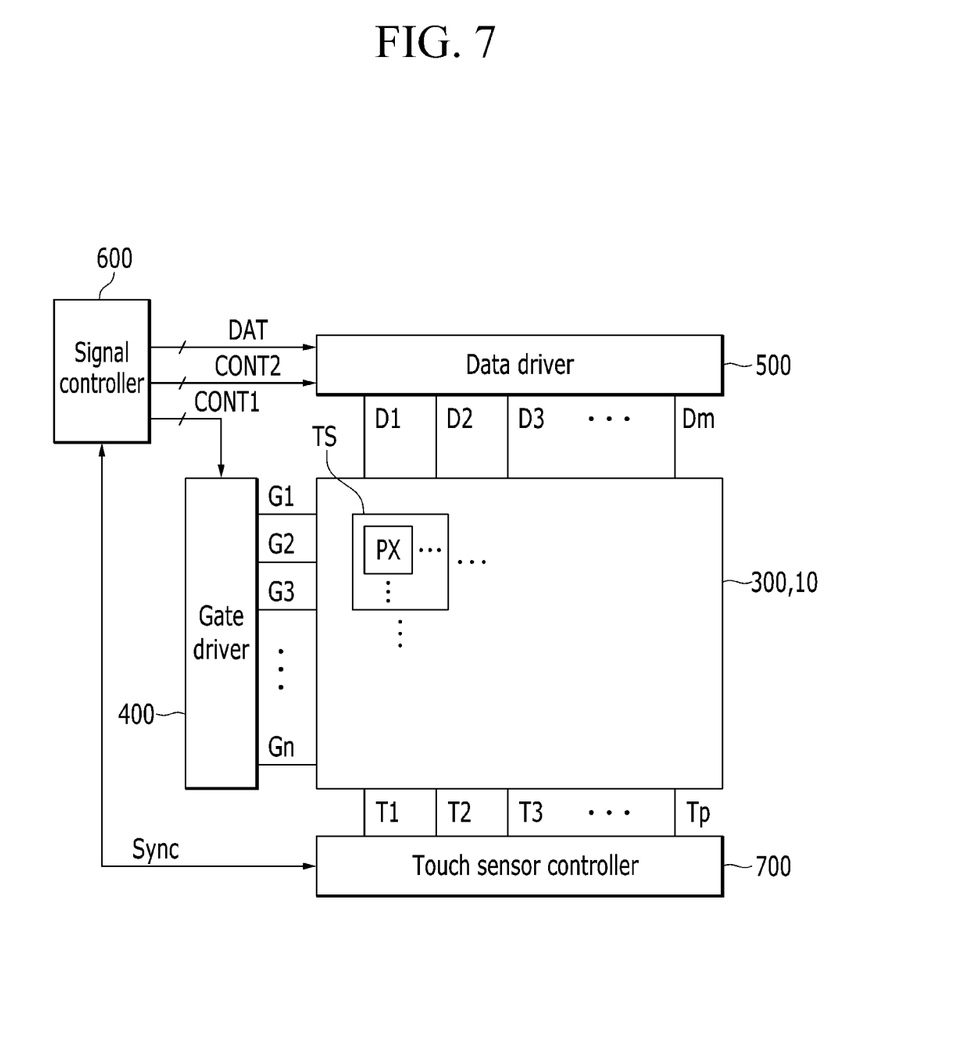
FIG. 7 is a layout view of a display device including a touch panel according to an exemplary embodiment.

FIG. 7 is a layout view of a display device includes a touch panel according to an exemplary embodiment.

Referring to FIG. 7, the display device including the touch panel according to an exemplary embodiment includes a display panel 300, a gate driver 400 and a data driver 500 connected thereto, and a signal controller 600 controlling the gate driver 400 and the data driver 500. The display device also includes a touch panel 10 and a touch sensor controller 700 controlling it. The touch panel 10 may be formed or attached at an outer surface of the display panel 300, or may be formed inside the display panel 300.

The display panel 300 includes a plurality of gate lines G1-Gn and a plurality of data lines D1-Dm, and a plurality of pixels PX connected thereto and arranged in an approximate matrix shape. The touch panel 10 includes a plurality of touch signal lines T1-Tp and a plurality of touch sensors TS connected thereto and arranged in the approximate matrix shape. The touch sensor TS is realized by the described first and second electrode patterns A and B.

The gate lines G1-Gn approximately extend in the horizontal direction, and may transmit a gate signal of a combination of a gate-on voltage turning on a switching element connected to each pixel PX such as a thin film transistor (TFT) and a gate-off voltage turning it off. The data lines D1-Dm approximately extend in the vertical direction, and transmit a data voltage when the switch connected to each pixel PX is turned on.

The pixel PX is a unit displaying an image, each pixel uniquely displays one of primary colors or a plurality of pixels alternately display three primary colors as time passes, and a desired color is recognized by a spatial or temporal sum of the primary colors. Each pixel PX may be applied with the common voltage and the data voltage.

The touch signal lines T1-Tp extend in the approximate vertical direction, and are connected to the touch sensor TS to transmit the sensing input signal Tx and the sensing output signal Rx.

The touch sensor TS is the mutual capacitance type or the self-capacitance type, and may generate the sensing output signal according to the touch. The touch sensor TS may receive the sensing input signal from the touch signal lines T1-Tp, and output the capacitance change by the touch of the external object such as the finger or the pen as the sensing output signal through the touch signal lines T1-Tp.

The signal controller 600 receives input image signals R, G, and B and the control signal CONT thereof, that is, a horizontal synchronizing signal Hsync, a vertical synchronization signal Vsync, a clock signal CLK, a data enable signal DE, and the like, from an external graphics processor (not shown). The signal controller 600 processes the image signals R, G, and B to be suitable for operating conditions of the display panel 300 based on the image signals R, G, and B and the control signal CONT, and then generates and outputs image data DAT, a gate control signal CONT1, a data control signal CONT2, and a clock signal. The signal controller 600 may output a synchronization signal Sync to the touch sensor controller 700 and receive the touch information from the touch sensor controller 700.

The gate control signal CONT1 includes a start pulse vertical signal STV which instructs a start pulse, and a clock pulse vertical signal CPV which is a reference of generating a gate-on voltage Von. An output period of the start pulse vertical signal STV coincides with one frame or a refresh rate. The gate control signal CONT1 may further include an output enable signal OE which limits a sustain time of the gate-on voltage Von.

The data control signal CONT2 includes a start pulse horizontal signal STH which instructs transmission start of the image data DAT for the subpixels of one row, a load signal TP which instructs application of the corresponding data voltage to data lines D1 to Dm, and the like. The data control signal CONT2 may further include an inversion signal REV which inverts a polarity of the data voltage with respect to a common voltage when the display panel 300 is a liquid crystal panel.

The gate driver 400 applies the gate signal of the gate-on voltage and the gate-off voltage to the gate lines G1-Gn according to the gate control signal CONT1.

The data driver 500 receives the data control signal CONT2 and the image data DAT from the signal controller 600 and converts the image data DAT into the data voltage by using a gray voltage generated from a gray voltage generator (not shown) to apply the data voltage to the data lines D1-Dm.

The touch sensor controller 700 transmits the sensing input signal Tx to the touch sensor TS, and receives the sensing output signal Rx from the touch sensor TS to generate the touch information.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

DESCRIPTION OF SYMBOLS

| | |
|---|---|
| 10: touch panel | 20: sensor circuit |
| TS: touch sensor | 300: display panel |
| 400: gate driver | 500: data driver |
| 600: signal controller | 700: touch sensor controller |
| A: first electrode pattern | B: second electrode pattern |
| a11, a12, . . . : first electrode cell | b111, b211, . . . : second electrode cell |
| la1, la2, . . . : first touch signal line | lb1, lb, . . . : second touch signal line |
| Rx: sensing input signal | Tx: sensing output signal |
| BL: bus line | |

What is claimed is:

1. A touch panel comprising:
a first sensing column including:
a first electrode, a second electrode, and a third electrode sequentially arranged in a column direction;
a first group of electrodes, a second group of electrodes, and a third group of electrodes sequentially arranged in the column direction, wherein:
the first group of electrodes are adjacent to the first electrode in a row direction, the second group of electrodes are adjacent to the second electrode in the row direction, and the third group of electrodes are adjacent to the third electrode in the row direction, and
each group of the first group of electrodes, the second group of electrodes, and the third group of electrodes includes a fourth electrode and a fifth electrode sequentially arranged in the column direction;
a first group of signal lines electrically connecting the first group of electrodes with the second group of electrodes; and
a second group of signal lines electrically connecting the second group of electrodes with the third group of electrodes,
wherein
the first group of signal lines includes:
a first signal line electrically connecting the fourth electrode of the first group of electrodes with the fifth electrode of the second group of electrodes; and
a second signal line electrically connecting the fifth electrode of the first group of electrodes with the fourth electrode of the second group of electrodes.

2. The touch panel of claim 1, wherein
each group of the first group of electrodes, the second group of electrodes, and the third group of electrodes further includes a sixth electrode disposed between the fourth electrode and the fifth electrode, and
the first group of signal lines further includes:
a fifth signal line electrically connecting the sixth electrode of the first group of electrodes with the sixth electrode of the second group of electrodes and being disposed at only one side of the first to third groups of electrodes; and
the second group of signal lines includes:
a sixth signal line electrically connecting the sixth electrode of the second group of electrodes with the sixth electrode of the third group of electrodes and being disposed at only another side of the first to third groups of electrodes.

3. The touch panel of claim 1, wherein
each electrode of the first group of electrodes forms a mutual capacitance type of touch sensor in combination with the first electrode,
each electrode of the second group of electrodes forms a mutual capacitance type of touch sensor in combination with the second electrode, and
each electrode of the third group of electrodes forms a mutual capacitance type of touch sensor in combination with the third electrode.

4. The touch panel of claim 3, wherein
each of the first electrode, the second electrode, and the third electrode forms a self-capacitance type of touch sensor.

5. The touch panel of claim 3, wherein
the first to third electrodes, the first and second groups of electrodes, and the first and second groups of signal lines are disposed at a same layer.

6. The touch panel of claim 1, wherein
the first and second signal lines are disposed at only one and the same side of the first and second groups of electrodes.

7. The touch panel of claim 3, further comprising:
a second sensing column parallel to the first sensing column, the second sensing column including:
a first electrode, a second electrode, and a third electrode sequentially arranged in the column direction; and
a first group of electrodes, a second group of electrodes, and a third group of electrodes sequentially arranged in the column direction, wherein:
the first group of electrodes are adjacent to the first electrode in a row direction, the second group of electrodes are adjacent to the second electrode in the row direction, and the third group of electrodes are adjacent to the third electrode in the row direction, and
each group of the first group of electrodes, the second group of electrodes, and the third group of electrodes includes a fourth electrode and a fifth electrode sequentially arranged in the column direction,
wherein each of the fourth and fifth electrodes of the first to third groups of electrodes in the first sensing column is individually electrically connected with each of the fourth and fifth electrodes of the first to third groups of electrodes in the second sensing column.

8. The touch panel of claim 1, wherein
the second group of signal lines includes:
a third signal line electrically connecting the fourth electrode of the second group of electrodes with the fifth electrode of the third group of electrodes; and
a fourth signal line electrically connecting the fifth electrode of the second group of electrodes with the fourth electrode of the third group of electrodes.

9. The touch panel of claim 1 wherein
the first sensing column further includes signal lines that are independently connected to each of the first to third electrodes.

10. The touch panel of claim 1, wherein
each of the first group of signal lines is symmetrical with respect to a line extending in the row direction between the first group of electrodes and the second group of electrodes, and
each of the second group of signal lines is symmetrical with respect to a line extending in the row direction between the second group of electrodes and the third group of electrodes.

11. A display device comprising:
a display panel including a plurality of pixels;
a touch sensing unit including a plurality of touch sensors;
a display controller controlling the display panel; and
a touch sensor controller controlling the touch sensing unit,
wherein the touch sensing unit includes:
a first sensing column including:
a first electrode, a second electrode, and a third electrode sequentially arranged in a column direction;
a first group of electrodes, a second group of electrodes, and a third group of electrodes sequentially arranged in the column direction, wherein:
the first group of electrodes are adjacent to the first electrode in a row direction, the second group of electrodes are adjacent to the second electrode in the row direction, and the third group of electrodes are adjacent to the third electrode in the row direction, and
each group of the first group of electrodes, the second group of electrodes, and the third group of electrodes includes a fourth electrode and a fifth electrode sequentially arranged in the column direction;
a first group of signal lines electrically connecting the first group of electrodes with the second group of electrodes; and
a second group of signal lines electrically connecting the second group of electrodes with the third group of electrodes,
wherein
the first group of signal lines includes:
a first signal line electrically connecting the fourth electrode of the first group of electrodes with the fifth electrode of the second group of electrodes; and
a second signal line electrically connecting the fifth electrode of the first group of electrodes with the fourth electrode of the second group of electrodes.

12. The display device of claim 11, wherein
each electrode of the first group of electrodes forms a mutual capacitance type of touch sensor in combination with the first electrode,
each electrode of the second group of electrodes forms a mutual capacitance type of touch sensor in combination with the second electrode, and
each electrode of the third group of electrodes forms a mutual capacitance type of touch sensor in combination with the third electrode.

13. The display device of claim 12, wherein
each of the first electrode, the second electrode, and the third electrode forms a self-capacitance type of touch sensor.

14. The display device of claim 12, wherein
the first to third electrodes, the first and second groups of electrodes, and the first and second groups of signal lines are disposed at a same layer.

15. The display device of claim 12, wherein
the touch sensing unit further includes:
a second sensing column parallel to the first sensing column, the second sensing column including:
a first electrode, a second electrode, and a third electrode sequentially arranged in the column direction; and
a first group of electrodes, a second group of electrodes, and a third group of electrodes sequentially arranged in the column direction, wherein:
the first group of electrodes are adjacent to the first electrode in a row direction, the second group of electrodes are adjacent to the second electrode in the row direction, and the third group of electrodes are adjacent to the third electrode in the row direction, and
each group of the first group of electrodes, the second group of electrodes, and the third group of electrodes includes a fourth electrode and a fifth electrode sequentially arranged in the column direction,
wherein each of the fourth and fifth electrodes of the first to third groups of electrodes in the first sensing column is individually electrically connected with each of the fourth and fifth electrodes of the first to third groups of electrodes in the second sensing column.

16. The display device of claim 11, wherein
the first and second signal lines are disposed at only one and the same side of the first and second groups of electrodes.

17. The display device of claim 11, wherein
the second group of signal lines includes:
a third signal line electrically connecting the fourth electrode of the second group of electrodes with the fifth electrode of the third group of electrodes; and
a fourth signal line electrically connecting the fifth electrode of the second group of electrodes with the fourth electrode of the third group of electrodes.

18. The display device of claim 17, wherein
each group of the first group of electrodes, the second group of electrodes, and the third group of electrodes further includes a sixth electrode disposed between the fourth electrode and the fifth electrode, and
the first group of signal lines further includes:
a fifth signal line electrically connecting the sixth electrode of the first group of electrodes with the sixth electrode of the second group of electrodes and being disposed at only one side of the first to third groups of electrodes; and
the second group of signal lines further includes:
a sixth signal line electrically connecting the sixth electrode of the second group of electrodes with the sixth electrode of the third group of electrodes and being disposed at only another side of the first to third groups of electrodes.

19. The display device of claim 11, wherein
the first sensing column further includes signal lines that are independently connected to each of the first to third electrodes.

20. The display device of claim 11, wherein
each of the first group of signal lines is symmetrical with respect to a line extending in the row direction between the first group of electrodes and the second group of electrodes, and
each of the second group of signal lines is symmetrical with respect to a line extending in the row direction between the second group of electrodes and the third group of electrodes.

* * * * *